(12) United States Patent
DeJong et al.

(10) Patent No.: US 8,501,326 B2
(45) Date of Patent: Aug. 6, 2013

(54) WAX REPLACEMENT SPECIALTY FORMULATED CORRUGATING ADHESIVE

(75) Inventors: Shawn E. DeJong, Apple Valley, CA (US); Michael Kircher, Brandenton, FL (US)

(73) Assignee: Henkel Corporation, Rocky Hill, CT (US)

( * ) Notice: Subject to any disclaimer, the term of this patent is extended or adjusted under 35 U.S.C. 154(b) by 3 days.

(21) Appl. No.: 13/178,799

(22) Filed: Jul. 8, 2011

(65) Prior Publication Data

US 2011/0259945 A1    Oct. 27, 2011

Related U.S. Application Data

(63) Continuation of application No. PCT/US2010/020463, filed on Jan. 8, 2010.

(60) Provisional application No. 61/143,505, filed on Jan. 9, 2009.

(51) Int. Cl.
*B32B 23/04* (2006.01)

(52) U.S. Cl.
USPC ......... 428/532; 428/537.5; 428/214; 427/408

(58) Field of Classification Search
USPC ...................................... 428/532, 537.5, 214
See application file for complete search history.

(56) References Cited

U.S. PATENT DOCUMENTS

| | | | |
|---|---|---|---|
| 4,033,914 A | 7/1977 | Bovier et al. | |
| 5,286,769 A | 2/1994 | Eden et al. | |
| 5,393,336 A | 2/1995 | Foran et al. | |
| 5,405,437 A | 4/1995 | Leake et al. | |
| 5,641,349 A | 6/1997 | Koubek et al. | |
| 5,698,295 A | 12/1997 | Benner et al. | |
| 6,648,955 B1 | 11/2003 | Swiezkowski et al. | |
| 6,794,016 B2 | 9/2004 | Kumabe et al. | |

FOREIGN PATENT DOCUMENTS

| | | | |
|---|---|---|---|
| JP | 05-239422 | * | 9/1993 |
| JP | 05239422 A | | 9/1993 |
| WO | 9504082 A2 | | 2/1995 |

OTHER PUBLICATIONS

Anonymous, "Troubleshooting Corrugator Adhesive" Paperwise, Apr. 2002.*

Kohl, John. "Wet-strength resins: cost vs. quality. Shaving costs with inferior resins is false economy," Advanced Adhesives Report, Harper Love Adhesives Corporation, Feb. 2004.

Woodville-Price, Rex. "Testing for wet strength," Advanced Adhesives Report, Harper Love Adhesives Corporation, Feb. 2004.

Anonymous. "Troubleshooting Corrugator Adhesives," Paperwise, Smurfit-Stone Board Sales, Apr. 2002.

Anonymous. "Celanese Emulsions offers a comprehensive range of starches suitable for glass fiber yarn sizing," Celanese, Retrieved from http://www.celanese.com/celem4270_flyer.english_vf-2, May 2003.

* cited by examiner

*Primary Examiner* — Leszek Kiliman
(74) *Attorney, Agent, or Firm* — Sun Hee Lehmann

(57) ABSTRACT

Adhesive compositions have properties that make them particularly well suited for recyclable corrugated boards for use in transporting and storing perishable foods such as fresh and frozen produce, seafood and meats together with ice, or under refrigeration.

14 Claims, No Drawings

WAX REPLACEMENT SPECIALTY FORMULATED CORRUGATING ADHESIVE

CROSS-REFERENCE TO RELATED APPLICATIONS

This application is a continuation of International Patent Application No. PCT/US2010/020463 filed Jan. 8, 2010, which claims the benefit of U.S. Provisional Patent Application No. 61/143,505 filed Jan. 9, 2009, the contents of both of which are incorporated herein by reference.

FIELD OF THE INVENTION

The present invention relates to an adhesive that may be used to prepare recyclable water-resistant corrugated board. The corrugated board may advantageously be used for transporting and storing perishable foods such as fresh and frozen seafood, vegetables, fruits and meats together with ice, and/or under refrigeration.

BACKGROUND OF THE INVENTION

Corrugated board or container board is a versatile and relatively inexpensive packaging medium, and is widely used for transportation and storage of goods. Corrugated paper board container is commonly prepared by first forming a corrugated element or medium by passing a cellulosic sheet between corrugating rolls forming a substantially sinusoidal or serpentine cross-section in the sheet. An adhesive is commonly applied to the tips of the thus formed sinusoidal portion called flutes and a noncorrugated or planar cellulosic liner is applied against the adhesive coated flutes of the corrugated elements as the corrugated sheet passes between a corrugating roll and a pressure roll. The resulting paper product having the corrugating medium on one side and the planar liner on another side is called a single-faced web. The single-faced element may be used, as is, in certain applications as a liner or buffer material within a container. More commonly, adhesive is applied to the flute tips of the single-faced web and a second liner sheet is subsequently applied to the fluted medium in a "double facer" operation. The second liner sheet is exposed to conditions of heat and pressure during its contact with the adhesive. In practice, the sheet of corrugated cardboard most frequently encountered has two plane sides placed on each side of the corrugated medium. Depending on the specific strength desired, a sheet of corrugated cardboard may also be provided with a more complex structure, such as two corrugated medium and three plane surfaces, two outer ones and one inner one separating the two corrugated medium. This is referred to as double wall board.

Starch-based adhesives are most commonly used in the corrugating process due to their desirable adhesive properties, low cost and ease of preparation. The most fundamental starch corrugating adhesive, commonly referred to as a "Stein-Hall" formulation, is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the fully formulated adhesive. In conventional corrugating processes, the adhesive is applied to the tips of the fluted paper medium or single-faced board, whereupon the application of heat and pressure causes the raw starch to gelatinize, resulting in an instantaneous increase in viscosity and formation of the adhesive bond. In other words, the adhesive is applied while relatively cool and then, subsequently, requires the application of high temperatures at the points of bonding to effect in situ gelatinization of the raw starch granules.

Ordinary corrugated fiberboard containers manufactured in a Stein-Hall adhesive are not resistant to moisture. While water resistant additives, such as ketone-aldehyde have been added to Stein-Hall adhesives to increase moisture- and water-resistance, such addition is insufficient when the boards are exposed to conditions of high humidity and prolonged moisture levels. Water-repellency and water resistance have, therefore, been imparted to corrugated fiberboard sheets to be used for making containers for packaging, storing and/or transporting moisture-containing foods such as fruits, vegetables, fresh seafood, meats and frozen foods, as well as contents which must be maintained at a low temperature by impregnating them with a wax or wax-based material, for example, paraffin wax, polyethylene wax, carnauba wax and lanolin. The most widely used wax in corrugated board is paraffin wax. The most common application methods for applying wax for corrugated board are saturating or cascading and curtain coating.

Unfortunately, wax treated containers cannot be repulped, and such containers must be incinerated or disposed of in a landfill after use. Disposal is also economically disadvantageous, since used corrugated containers that are suitable for repulping have a significant resale value.

There continues to be a need in the art to eliminate or at least minimize the amount of wax required to prepare water-resistant corrugated fiberboard having a high water resistance and capable of being recycled after the use. The invention fulfills this need.

SUMMARY OF THE INVENTION

The invention is directed to a recyclable corrugated boards and container made therewith that provides high water resistance without the need for wax impregnation. It has been discovered that the use of a starch that has high amylose content in the formulation of corrugate adhesive imparts water resistant properties, which can be used to prepare corrugated boards without the need for wax impregnation. The invention provides a water resistant adhesive comprising a starch component, in which the starch component contains a high amylose carrier starch and raw pearl starch, a caustic component, a boron component, a water resistant resin additive and water.

The corrugated containers of the invention comprises a corrugated medium attached to a planar cellulosic liner with an adhesive, wherein the adhesive comprises a high amylose starch, a caustic component, a boron containing component, a water resistant resin additive and water. In one preferred embodiment, the adhesive further comprises a liquid performance additive. In one embodiment, the high amylose starch has amylose content greater than 65%. In another embodiment, the high amylose starch has amylose content greater than 70%.

The invention further provides the art with a process for manufacturing a recyclable, water-resistant paperboard product. The process of the invention comprises applying a layer of the adhesive of the invention to a first and/or second substrate, which first and second substrates are independently selected from the group consisting of corrugated mediums and liner boards. The first substrate and second substrate are brought together such that the adhesive layer is located between the first substrate and the second substrate, and whereby the first substrate becomes bonded to the second substrate. In one embodiment, the paperboard product prepared using the adhesive of the invention is a corrugated board comprising at least one corrugated medium and at least one liner board. In one specific embodiment, the corrugated medium is bonded to at least one liner board using the adhesive of the invention. Surprisingly the paperboard products manufactured with the adhesive of the invention does not require wax impregnation for good water resistance. Adhesives prepared by these processes are encompassed by the invention, as are articles made with the prepared adhesives.

Yet another embodiment of the invention is directed to articles manufactured using the adhesive composition of the invention. Articles of the invention include boxes, trays, shipping and packaging containers that require moisture barrier during shipping and storage without wax impregnation. Encompassed articles include, but are not limited to recyclable corrugated container for packaging produce, seafood, meat, poultry, frozen items, and the like, that are packed with ice and/or under refrigeration during shipping and storage. The containers, boxes, trays and the like are manufacture in the absence of wax impregnation. The adhesives also find use in a number of other end use applications, including but not limited to the use as a bottle labeling adhesive, such as for example to apply a paper label to a glass bottle, and in bag-ending applications.

DETAILED DESCRIPTION OF THE INVENTION

All documents cited herein are incorporated in their entireties by reference.

It has been discovered that the adhesive of the invention may be used to prepare a recyclable, water resistant corrugated board without wax impregnation of the boards. The corrugated board prepared with the adhesive of the invention has similar performance properties to convention corrugated boards with the wax impregnation treatment.

A water resistant adhesive is used herein to mean that the adhesive imparts water resistance to a formed article, such as a corrugated board, prepared using the adhesive, which article does not voluntarily separate or come apart when exposed to humidity, moisture or water.

The adhesive of the invention comprises of a starch component, in which the starch component contains a high amylose carrier starch and raw pearl starch, a caustic component, a boron component, a water resistant resin additive and water, and an optional a liquid performance additive.

Components

The carrier starch useful for the adhesive of the invention is a high amylose starch. Particularly useful carrier starch has an amylose content of at least about 65%, more preferably greater than about 70%. The starch will preferably be modified by any suitable means in order to meet desired viscosity and solids requirements.

High amylose starches that can be used in the practice of the invention are not particularly limiting and include all starches derived from a native source, any of which may be suitable for use herein. A native starch as used herein, is one as it is found in nature. Also suitable are high amylose starches derived from a plant obtained by standard breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding, are also suitable herein.

Typical sources for the high amylose starches are cereals, tubers, roots, legumes and fruits. The native source can be corn, pea, potato, sweet potato, banana, barley, wheat, rice, sago, amaranth, tapioca, arrowroot, canna, sorghum and varieties thereof. Physically modified high amylose starches, such as sheared starches, or thermally-inhibited starches described in the family of patents represented by WO 95/04082, are suitable for use herein. Chemically modified products are also included as high amylose starch and include, without limitation, those which have been crosslinked, acetylated and organically esterified, hydroxyethylated and hydroxypropylated, phosphorylated and inorganically esterified, cationic, anionic, nonionic, hydrophobic, and zwitterionic, and succinate and substituted succinate derivatives thereof. Such modifications are known in the art, for example in *Modified Starches: Properties and Uses*, Ed. Wurzburg, CRC Press, Inc., Florida (1986). Conversion products derived from any of the starches, including fluidity or thin-boiling starches prepared by oxidation, enzyme conversion, acid hydrolysis, heat and or acid dextrinization, thermal and or sheared products are also useful.

Examples of useful high amylose starch components include Optamyl® SP starch, available from National Starch, Bridgewater, N.J., and Hylon VII available from Celanese, the Netherlands.

The raw starch useful for the adhesive of the invention is a raw pearl starch. The raw pearl starch is primarily used to build bulk of the solids and absorb water to form glue line strength. The raw starch will preferably be modified by any suitable means in order to meet desired viscosity and solids requirements.

The caustic component will typically be an aqueous solution of sodium hydroxide, but the practice of the invention is not limited thereto.

Boron-containing components used in the adhesive of the invention include, but are not limited to, borax, boric acid, or sodium metaborate.

The water resistant resin additives used in the adhesive of the invention include, but are not limited to, urea/formaldehyde resin, melamine/formaldehyde resin, polyamide-formaldehyde resin, glyoxal, ketone aldehyde resin, polyglycidyl ether, dialdehyde starch and epoxy functional alkoxysilanes. Exemplary epoxy functional alkoxysilanes include (3-glycidoxypropyl)trimethoxysilane, (3-glycidoxypropyl)triethoxysilane, (3-glycidoxypropyl)methyldimethoxysilane, (3-glycidoxypropyl) methyldiethoxysilane, (3-glycidoxypropyl) dimethylmethoxysilane, (3-glycidoxypropyl) dimethylethoxysilane, 5,6-epoxyhexyltrimethoxysilane, 5,6-epoxyhexyltriethoxysilane, 5,6-epoxyhexylmethyldimethoxysilane, 5,6-epoxyhexylmethyldiethoxysilane, 5,6-epoxyhexyldimethylmethoxysilane, 5,6-epoxyhexyldimethylethoxysilane, epoxycyclohexyl)ethyltrimethoxysilane, 2-(3,4-epoxycyclohexyl)ethyltriethoxysilane, [(chloromethyl)phenylethyl]trimethoxysilane, [(chloromethyl)phenylethyl]methydimethoxysilane, (p-chloromethyl)phenyltrimethoxysilane, chloromethylriethoxysilane, 3-chloropropyltriethoxysilane, 3-chloropropyltrimethoxysilane, 3-chloropropylmethyldimethoxysilane and chloromethylmethyldiethoxysilane.

The liquid performance additives used in the adhesive of the invention include, but are not limited to polyvinyl alcohol and polyvinyl acetate.

Adhesives formulated for use in corrugating will typically have a solids content of greater than about 10%. Typical corrugating formulations will generally comprise, for example, based on the weight of the final formulation, from about 20 to about 60 wt % total starch, in which at least 7% of the starch is a high amylose starch (at least 2% based on the final formulation), from about 0.1 to about 5 wt % of solid caustic, from about 50 to about 80 wt % water, from 0.1 to about 10 wt % of a boron component, about 0.1 to 10 wt % of a water resistant resin additive and 0.1 to 10 wt % of liquid performance additive component. In one preferred embodiment the starch component is an Optamyl® SP starch, the caustic used is a 25% aqueous solution of sodium hydroxide, the boron component is borax, the water resistant resin additive is a ketone-formaldehyde and the liquid performance additive is a polyvinyl alcohol. In another embodiment, the high amylose starch content may be at least 10% of the total starch (at least 3% based on the final formulation); in a further embodiment, the high amylose starch content may be at least 14% of the total starch (at least 4% based on the final formulation).

Other components typical of adhesive compositions may be added to the compositions. Such additives include, but are not limited to, plasticizers, acids, synthetic resins, tackifiers, defoamers, preservatives, bases such as sodium hydroxide, fillers, dyes, pigments, UV indicators, crosslinkers, rheology modifiers and other additives commonly used in the art.

The adhesive may also contain a surface-active agent. Examples of surface-active agents include anionic, cationic, amphoteric, or nonionic surfactants, or mixtures thereof. Suitable anionic surfactants include, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkylphenols, and esters of sulfosuccinic acid. Suitable cationic surfactants include, alkyl quaternary ammonium salts, and alkyl quaternary phosphonium salts. Suitable non-ionic surfactants include the addition products of 5 to 50 moles of ethylene oxide adducted to straight-chain and branched-chain alkanols having 6 to 22 carbon atoms, alkylphenols, higher fatty acids, higher fatty acid amines, primary or secondary higher alkyl amines, and block copolymers of propylene oxide with ethylene oxide, and mixtures thereof. When used, the surface active agent will typically be added in amounts up to about 20% by weight, based on the composition as a whole. More usually from amounts of from about 0.05 to about 20% by weight, and preferably at from 0.2 to 2% by weight.

Suitable fillers are those fillers known in the art as adhesives fillers and include polysaccharides, calcium carbonate, clay, mica, nut shell flours, silica, talc and wood flour. Clay filler may typically be used to prepare adhesives for use in the practice of the invention.

Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Commercially available preservatives which may be used in the practice of the invention include KATHON LXE sold by Rohm & Haas Company and Nipacide OBS sold by Clariant. The preservative will generally be included in amounts of from about 0.05% to about 0.2% by weight.

Method of Applying Adhesive onto the Substrates

The adhesives used in the process of the invention are applied to the flutes of a corrugated board, or to a liner board as known in the conventional method.

Adhesives of the invention may advantageously be used to manufacture a corrugated paperboard product, including corrugated paperboard manufactured using a dual arch corrugated medium.

Articles Manufactured with the Adhesive

The water-resistant adhesives of the invention are particularly well suited for the manufacture of recyclable corrugated paperboard in packaging perishable foods. The corrugated board manufactured with the adhesive of the invention may be used for transporting and storing perishable foods such as fresh and frozen seafood, vegetables, fruits and meats together with ice, or under refrigeration. Since the corrugated boards manufactured with the adhesive of the invention do not require wax impregnation treatment, the corrugated boards can be repulped and recycled.

Performance properties, such as edge crush and wet pin values, of the corrugate construction obtained with the adhesive of the invention are comparable to conventional corrugated board made with wax impregnation.

EXAMPLES

Example 1

Sample 1

An adhesive composition was prepared using components in the amount (expressed in % by weight of the final formulation) set forth in Table 1.

TABLE 1

| Component | Sample 1 (%) |
|---|---|
| Water | 19.91 |
| Optamyl ® SP starch (National Starch, Bridgewater, NJ) | 5.38 |
| sodium hydroxide (25% aq soln) | 1.35 |
| Borax (5 mol) | 0.26 |
| Water | 46.82 |
| Pearl corn starch | 22.62 |
| Borax (5 mol) | 0.22 |
| Dacrez ®[1] (Henkel Corporation, Bridgewater, NJ) | 1.72 |
| Velocity ®SP[2] (Henkel Corporation, Bridgewater, NJ) | 1.72 |

[1] water resistant resin additives
[2] liquid performance additives

This example illustrates one method of preparing the adhesive of the invention.

Optamyl® SP starch was slurried in water and heated to 100° C. with constant agitation at which point the sodium hydroxide solution was add to the mixture. Heating was continued rapidly with constant agitation and a first addition of Borax was added to the mixture. This mixture was then cooled with the second addition of water. Pearl corn starch, second addition of Borax, followed by Dacrez® was added to the mixture under agitation to reach a shear viscosity of about 35 Stein-Hall seconds. Velocity®SP was then added until the temperature reached 98° F. The prepared Sample 1 adhesive had a solids content of about 28.5%, a viscosity of 27-37 Stein-Hall seconds and gel point of 146-148° F.

Example 2

Preparation of Corrugated Paperboard

Three types of corrugated paperboards were prepared as set forth in Table 2.

TABLE 2

| Corrugated Paperboard | Adhesive | Wax impregnation |
|---|---|---|
| A | Sample 1 | None (repulpable) |
| B | Sample 1 | On medium (not repulpable) |
| C | Comparative Sample-Corralon ®[3] (Henkel Corporation, Bridgewater, NJ) | On medium (not repulpable) |

[3]Conventional Stein-Hall adhesive with water resistant resin additives

All of the corrugated paperboards were prepared using 26# medium C-flute, 42# Kraft liner with standard dimension of 2×5 inches. Wet adhesive was transfer coated to the flutes of the corrugated medium and the liner board placed in contact with the adhesive. Pressure was applied at 0.3 psi for about 30 seconds.

Example 3

Performance Testing

Water resistivity of corrugated paperboards of Example 2 was tested by soaking the boards in room temperature water for 24 hours, removed from water, and then immediately tested according to T-821 method. At least five samples were prepared and tested. The resultant wet pin performance for paperboards 74-45-57 and 90-45-69 (liner weight-medium weight-liner weight) are reported in Table 3 for both single face and double wall.

Stacking strength was also measured using Edge crush test (ECT) on the corrugated paperboards. At least five samples were prepared and tested. The results of the ECT are also reported in Table 3.

TABLE 3

| Corrugated Paperboard (liner wt-medium wt-liner wt) | SF Wet Pin Strength | DB Wet Pin Strength | ECT (lbs/in) |
|---|---|---|---|
| A board (74-45-57) | 8.6 ± 0.09 | 10.3 ± 0.06 | 63.3 ± 3.4 |
| B board (74-45-57) | 7.0 ± 0.09 | 4.2 ± 0.04 | 53.2 ± 3.2 |
| C board (74-45-57) | 4.9 + 0.1 | 6.6 + 0.07 | 52.0 + 6.6 |
| A board (90-45-69) | 7.3 + 0.08 | 3.7 + 0.06 | 54.6 + 2.6 |
| B board (90-45-69) | 3.9 + 0.09 | 4.3 + 0.07 | 59.0 + 1.6 |
| C board (90-45-69) | 5.4 + 0.09 | 4.1 + 0.06 | 60.3 + 2.5 |

Both wet pin strengths and ECT tests indicated that corrugated paperboards prepared with the adhesive of sample 1 without wax impregnation performed similarly to boards manufactured with conventional adhesive with wax impregnation.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A repulpable paperboard article prepared using an adhesive comprising:
   a) a starch component;
   b) a caustic component;
   c) a boron containing component;
   d) a water resistant resin additive component selected from the group consisting of urea/formaldehyde resin, polyamide-formaldehyde resin, glyoxal, ketone aldehyde resin, polyglycidyl ether, dialdehyde starch and mixtures thereof;
   e) a liquid performance additive; and
   f) water;
   wherein the starch component comprises a high amylose carrier starch and a a raw pearl corn starch.

2. The repulpable paperboard article of claim 1, wherein the high amylose carrier starch has an amylose content of at least 65%.

3. The repulpable paperboard article of claim 2, wherein the high amylose carrier starch has an amylose content of at least 70%.

4. The repulpable paperboard article of claim 1, wherein the liquid performance additive is a polyvinyl alcohol and/or a polyvinyl acetate.

5. The repulpable paperboard article of claim 4 wherein the liquid performance additive is polyvinyl alcohol.

6. The repulpable paperboard article of claim 1 wherein, the adhesive comprises:
   a) from about 20 to about 60 wt % of the starch component, wherein the starch comprises a high amylose carrier starch and a raw pearl corn starch;
   b) from about 0.1 to about 5 wt % of the caustic component;
   c) from about 0.1 to about 10 wt % of the boron containing component;
   d) from about 0.1 to about 10 wt % of the water resistant resin additive component selected from glyoxal or ketone aldehyde resin;
   e) from about 0.1 to about 10 wt % of a liquid performance component; and
   f) from about 50 to about 80 wt % of the water.

7. The repulpable paperboard article of claim 6 wherein the high amylose carrier starch comprises at least 7% of the starch component.

8. The repulpable paperboard article of claim 7 which is a corrugated board comprising at least one corrugated medium and at least one liner board.

9. The repulpable paperboard article of claim 7 wherein at least one said corrugated medium is bonded to at least on liner board using said adhesive.

10. The repulpable paperboard article of claim 2 which is a shipping container, box and/or tray.

11. The repulpable paperboard article of claim 10, wherein the shipping container is a container for packaging for produce, seafood, meat, poultry, and/or frozen item.

12. A packaged cold storage article comprising a repulpable packaging container, wherein said packaging container is prepared with an adhesive comprising:
   a) a high amylose carrier starch and a raw pearl corn starch;
   b) a caustic component;
   c) a boron containing component;
   d) a water resistant resin additive component selected from the group consisting of urea/formaldehyde resin, polyamide-formaldehyde resin, glyoxal, ketone aldehyde resin, polyglycidyl ether, dialdehyde starch or mixtures thereof;
   e) a liquid performance additive component; and
   f) water;
   wherein the starch component comprises a high amylose carrier starch.

13. The repulpable packaging container of claim 12 which is packaged with ice.

14. The repulpable packaging container of claim 12 wherein the water resistant resin additive component is glyoxal or ketone aldehyde resin.

* * * * *